US006216215B1

(12) United States Patent
Palanca et al.

(10) Patent No.: US 6,216,215 B1
(45) Date of Patent: *Apr. 10, 2001

(54) METHOD AND APPARATUS FOR SENIOR LOADS

(75) Inventors: Salvador Palanca, Folsom; Shekoufeh Qawami, El Dorado Hills; Niranjan L. Cooray, Folsom; Angad Narang, Rancho Cordova; Subramaniam Maiyuran, Fair Oaks, all of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,932

(22) Filed: Apr. 2, 1998

(51) Int. Cl.[7] .................................................. G06F 9/30
(52) U.S. Cl. ........................................................... 712/23
(58) Field of Search ..................................... 712/216, 245, 712/23, 24

(56) References Cited

U.S. PATENT DOCUMENTS 5,778,245 * 7/1998 Papworth et al. ............... 395/800.23

OTHER PUBLICATIONS

Visual Instruction Set (VIS) User's Guide, Sun Microsystems, Version 1.1, Mar. 1997, pp i–xii, 1–127.
AMD–3D Technology Manual, Advance Micro Devices, (AMD), Feb. 1998, pp i–x, 1–58.
TM10000 Preliminary Data Book, Philips Semiconductors, Jul. 7, 1997, pp 3–6, 66–68, 100–106, 125–128, 139–143, 155–160, 181–187.

* cited by examiner

Primary Examiner—David Y. Eng
(74) Attorney, Agent, or Firm—Blakely, Sokoloff, Taylor & Zafman LLP

(57) ABSTRACT

The present invention discloses a method and apparatus for implementing a senior load instruction type. An instruction requesting a memory reference is decoded. The decoded instruction is then dispatched to a memory ordering unit. The instruction is retired from a load buffer and is executed after retiring.

45 Claims, 11 Drawing Sheets

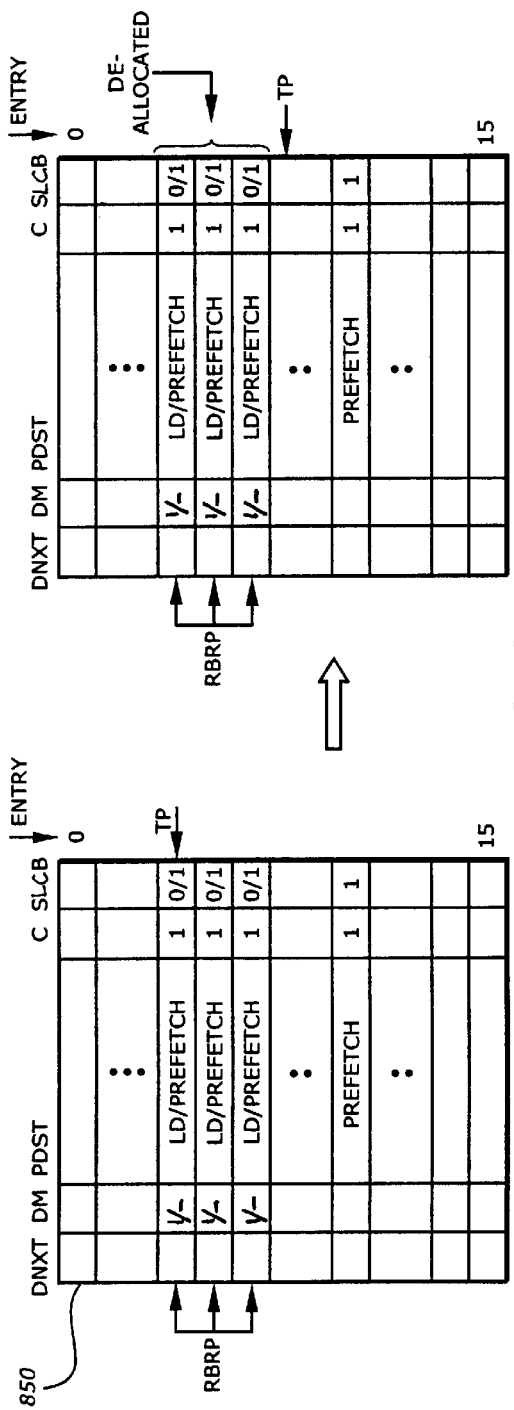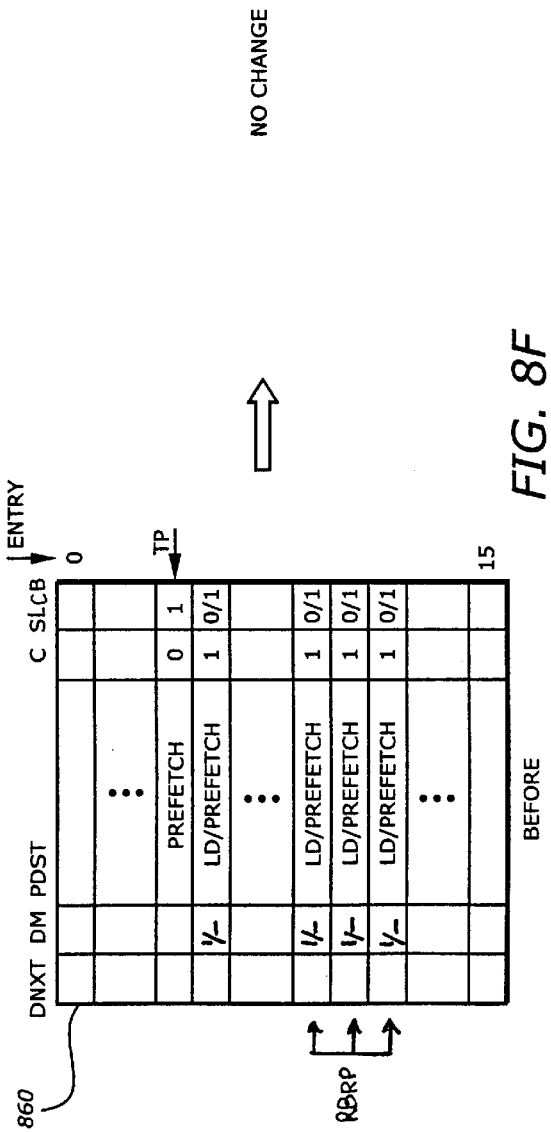
FIG. 8E
FIG. 8F

METHOD AND APPARATUS FOR SENIOR LOADS

BACKGROUND OF THE INVENTION

1. Field of the Invention

This invention relates to microprocessor systems. In particular, the invention relates to senior loads.

2. Description of Related Art

Retirement of an instruction refers to a process of completing the execution of an instruction without any faults or interrupts and updating accordingly the architectural state of the processor. To enhance performance, it is desirable to retire an instruction prior to its execution. In pipelined architecture, an instruction typically goes through a number of pipeline stages. Early retirement of an instruction in a pipeline architecture reduces stalls of subsequent instructions in an in-order processor and provides a smooth pipeline flow. However, as pipeline architecture becomes more and more complex, implementing an efficient retirement mechanism in a pipeline architecture presents a number of challenges.

An important type of instruction is the load instruction. The load instruction essentially reads the data from memory and then writes the data into a register inside the processor. Because a register is part of the architectural state of the processor, it is important to ensure that the contents of the register are not erroneously written. When a number of load instructions enter the pipeline, problems may arise when they are executed out of order.

An instruction may be executed in order or out of order. An in-order execution processes a stream of instructions in the same order as they enter the pipeline, which is the program order. An out-of-order execution processes an instruction out of the order as it enters the pipeline stages. Although in-order execution is simpler to design, out-of-order execution sometimes is necessary to improve performance. An out-of-order execution improves performance by reducing the idle time waiting for a previous instruction in program order to be completed. However, out-of-order execution may create problems in maintaining the proper sequence of operations. This situation is especially serious for load instructions because the load instructions may erroneously overwrite the contents of the destination register if not carefully designed.

An early retirement of a load instruction in a stream of pipeline instructions may cause a problem, especially when there is a branch misprediction or other exception conditions.

Therefore there is a need in the technology to provide an efficient and accurate method to retire a load instruction without causing incorrect data writeback.

SUMMARY OF THE INVENTION

The present invention discloses a method and apparatus for implementing a senior load instruction type. An instruction requesting a memory reference is decoded. The decoded instruction is then dispatched to a memory ordering unit. The instruction is retired from a load buffer and is executed after retiring.

BRIEF DESCRIPTION OF THE DRAWINGS

The features and advantages of the invention will become apparent from the following detailed description of the invention in which:

FIG. 8E is a diagram illustrating a scenario in which three LD/PREFETCH entries have been completed and have their DM bits set (for LD), according to one embodiment of the invention.

FIG. 8F is a diagram illustrating a scenario in which the first PREFETCH has not been completed, according to one embodiment of the invention.

DESCRIPTION OF THE PRESENT INVENTION

The present invention discloses a method and apparatus for providing a senior load instruction type. The senior load is a load instruction which is retired before execution. This process improves the performance by eliminating pipeline stalls allowing instructions that have been completed and were dispatched after the senior load to be retired without delay. The mechanism to support the implementation of the senior load includes control for early retirement, and de-allocation logic in a memory ordering load buffer.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
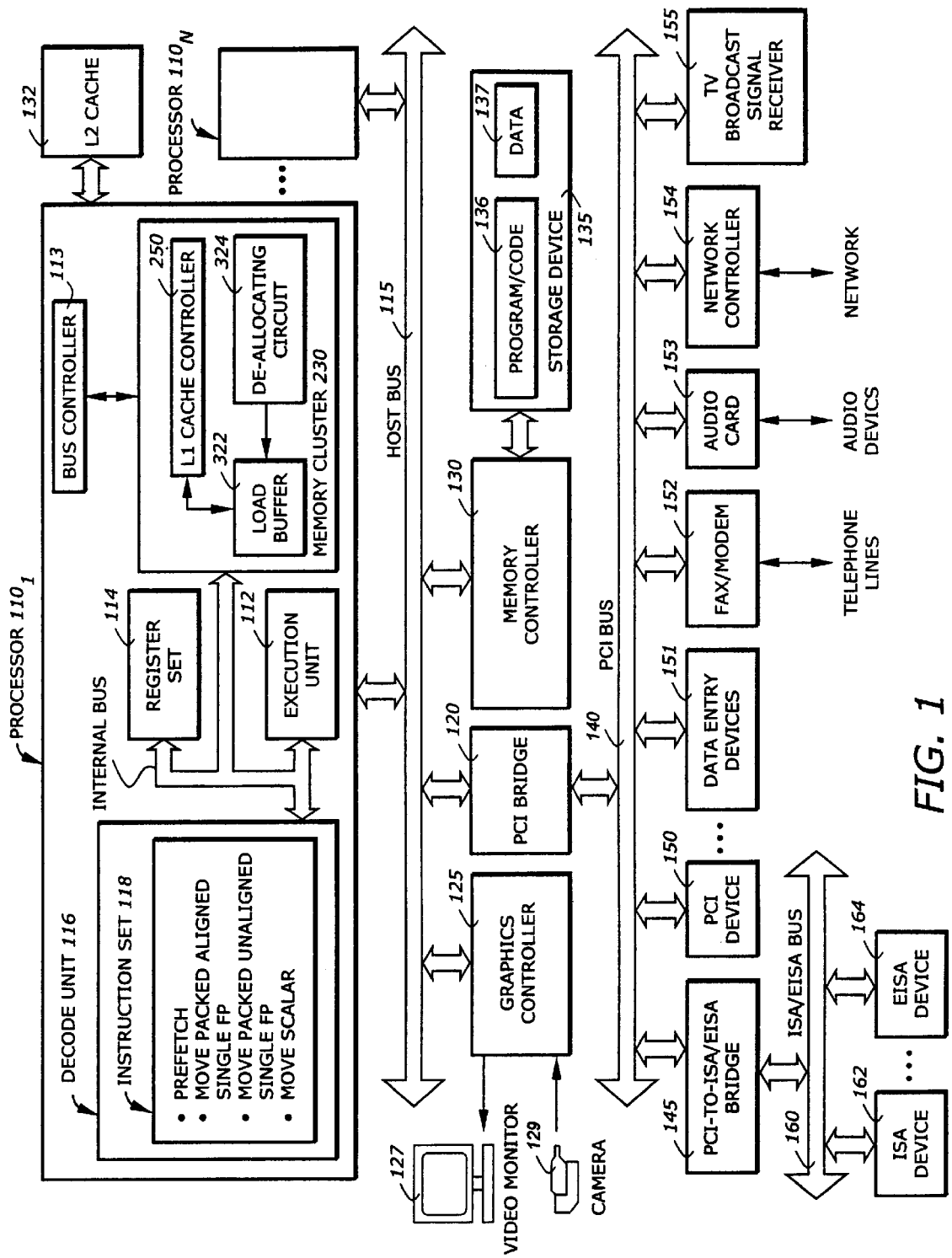
FIG. 1 is a diagram illustrating one embodiment of a system in accordance with the teachings of the present invention.

FIG. 1 is a diagram illustrating one embodiment of a computer system 100 in accordance with the teachings of the present invention. Computer system 100 comprises a number of processors $110_1$ through $110_N$, a bus bridge 120, an external cache (e.g., L2 cache) 132, and a memory controller 130.

Each of the processors $110_1$ through $110_N$ represents a central processing unit of any type of architecture, such as CISC, RISC, VLIW, or hybrid architecture. In addition, each of the processors $110_1$ through $110_N$ is capable of multiprocessing although this invention can be practiced without the requirement of multiprocessing capabilities. The processors $110_1$ through $110_N$ are coupled to the bus bridge 120 and the memory controller 130 via a host bus 115. While this embodiment is described in relation to a single processor computer system, the invention could be implemented in a multi-processor computer system.

The bus bridge 120 provides an interface between the host bus 115 and an expansion bus 140 (e.g., PCI bus). The bus bridge 120 (e.g., PCI bridge) also provides a graphic port, e.g., Accelerated Graphics Port (AGP), for connecting to a graphics controller 125. While one embodiment is shown that includes a graphic port, alternative embodiments can support graphics capture and display using any number of techniques. The graphics controller 125 is interfaced to a video monitor 127 and a camera 129. The video monitor 127 displays graphics and images rendered or processed by the graphics controller 125. The camera 129 acquires images and transfers and image data to the graphics controller 125.

The memory controller 130 provides an interface between the host bus 115 and a storage device 135. The storage device 135 represents one or more mechanisms for storing data. For example, the storage device 135 may include read only memory (ROM), random access memory (RAM), magnetic disk storage mediums, optical storage mediums, flash memory devices, and/or other machine-readable mediums. FIG. 1 also illustrates that the storage device 135 has stored therein data 137 and program/code 136. Data 137 represents data stored in one or more of the formats described herein. Program code 136 represents the necessary code for performing any and/or all of the techniques in the present invention. Of course, the storage device 135 preferably contains additional software (not shown), which is not necessary to understanding the invention.

The expansion bus 140 represents an expansion bus that allows the processors $110_1$ through $110_N$ to communicate with a number of peripheral devices. The expansion bus 140 provides an interface to an expansion-to-peripheral bridge 145 (e.g., PCI-to-ISA/EISA bridge), an expansion device 150 (e.g., PCI device), a data entry device controller 151, a fax/modem controller 152, an audio card 153, a network controller 154, and a TV broadcast signal receiver 155.

The expansion-to-peripheral bridge 145 represents an interface device between the expansion bus 140 and an peripheral bus 160. The peripheral bus 160 represents a peripheral bus (e.g., ISA/EISA bus) that interfaces to a number of peripheral devices, including an ISA device 162 and an EISA device 164. The expansion device 150 represents any device that is interfaced to the expansion bus 140. The data entry interface 151 represents an interface to data entry devices such as tablet digitizer, mouse, etc. The fax/modem 152 represents a fax and/or modem for receiving and/or transmitting analog signals representing data. The audio card 153 represents one or more devices for inputting and/or outputting sound (e.g., microphones, speakers, magnetic storage devices, optical storage devices, etc.). The network controller 155 represents one or more network connections (e.g., an ethernet connection). The TV broadcast signal receiver 155 represents a device for receiving TV broadcast signals.

BASIC PROCESSOR ARCHITECTURE

FIG. 1 additionally illustrates that the processor 1101 includes a decode unit 116, a set of registers 114, a bus controller 113, a memory cluster 230, an execution unit 112, and an internal bus 111 for executing instructions. Of course, the processor $110_1$ contains additional circuitry, which is not necessary to understanding the invention. The decode unit 116, registers 114 and execution unit 112 are coupled together by the internal bus 111. The bus controller 113 provides interface to the host bus 115 and an external cache 132 (e.g., L2 cache). The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention. The memory cluster 230 includes a L1 cache controller (L1CC) 250, a load buffer 322, and a de-allocating circuit 324.

The decode unit 116 is shown including instruction set 118. The instruction set 118 includes packed data instructions and senior load and non-senior load instructions such as PREFETCH (a senior load instruction), MOVSS (non-senior load), MOVAPS (non-senior load), MOVUPS (non-senior load). In addition to the packed data instructions, the processor $110_1$ can include new instructions and/or instructions similar to or the same as those found in existing general purpose processors. For example, in one embodiment the processor $110_1$ supports an instruction set which is compatible with the Intel Architecture instruction set used by existing processors, such as the Pentium® processor manufactured by Intel Corporation of Santa Clara, Calif. Alternative embodiments of the invention may contain more or less, as well as different, packed data instructions and still utilize the teachings of the invention.

The registers 114 represent a storage area on processor $110_1$ for storing information, including control/status information, integer data, floating point data, and packed data. It is understood that aspects of the invention are the described instruction set for operating on packed data, as well as how those instructions are used. According to these aspects of the invention, the storage area used for storing the packed data is not critical. The term data processing system is used herein to refer to any machine for processing data, including the computer systems(s) described with reference to FIG. 1.

Figure 2:
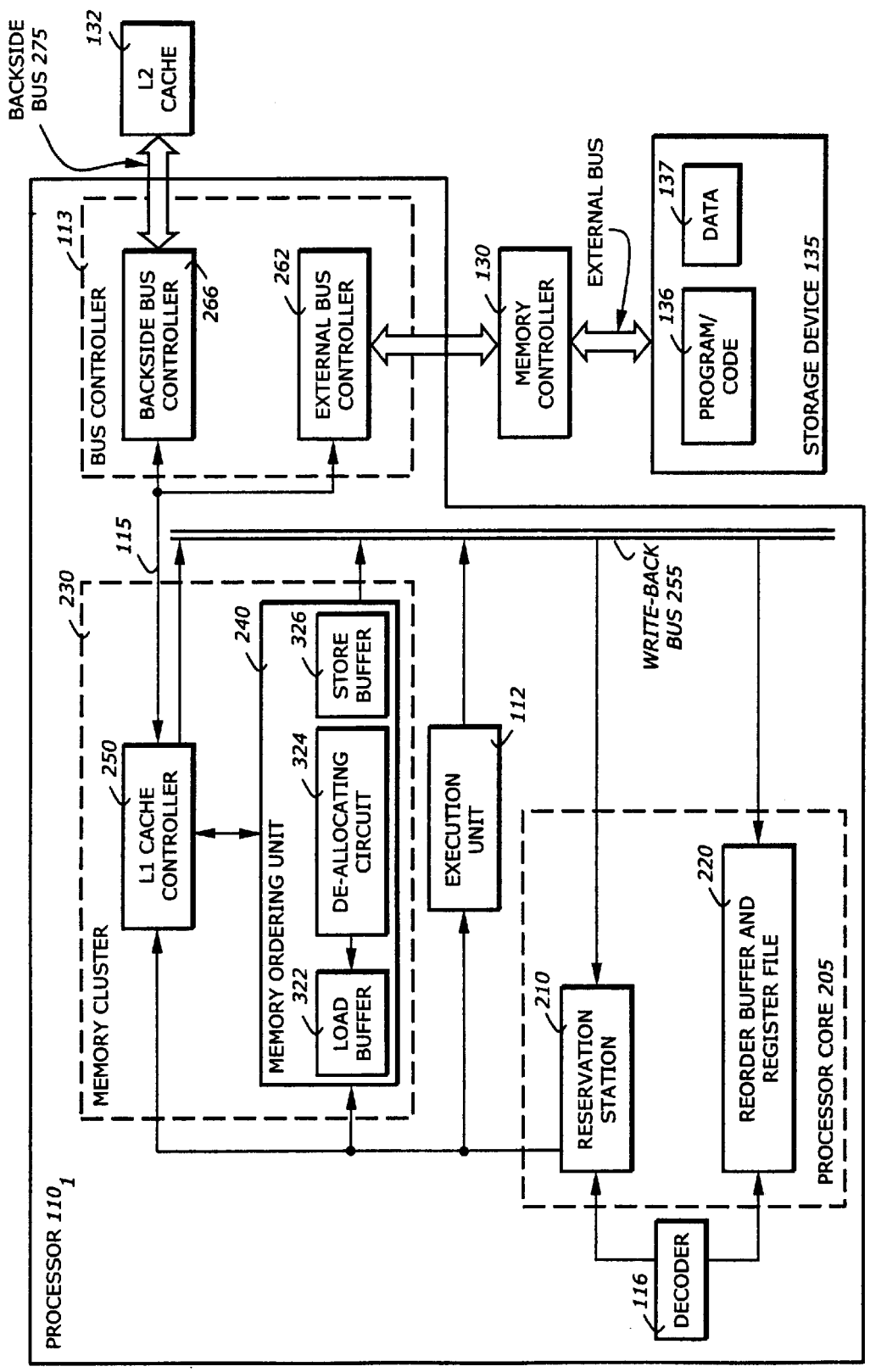
FIG. 2 is a diagram illustrating one embodiment of a processor in accordance with the teachings of the present invention.

FIG. 2 is a diagram illustrating the computer system 100 according to one embodiment of the invention. While one exemplary computer system is described, the invention can be implemented in any number of different computer systems (e.g., one that has more or less cache levels, one that uses a different register renaming and/or out-of-order execution architecture). For simplicity, only relevant elements of the system 100 are shown. The computer system 100 includes the processor 110, a backside bus 275, a level 2 (L2) cache subsystem 132, the processor bus 115, the memory controller 130, and the storage device 135.

The processor 110 includes the decoder 116, a processor core 205, the execution unit 112, a memory cluster 230, a bus controller 113, and a write-back data bus 255. The processor core 205 includes a reservation station 210 and a re-order buffer and register file 220. The memory cluster 230 further includes a memory ordering unit (MOU) 240 and a Level 1 (L1) cache controller 250. For simplicity, the L1 cache memory is not shown. The MOU 240 includes a load buffer 322, a de-allocating circuit 324, and a store buffer 326. While the processor core 205 is shown supporting out-of-order execution, the invention can be practiced with the processor core 205 supporting in-order execution.

The decoder 116 issues instructions to the reservation station 210 and to the re-order buffer and register file 220. The reservation station 210 dispatches the decoded instruction to the execution unit 112 and the memory cluster 230. If the instruction is ready to be executed, the execution unit 112 will carry out the operation. If the instruction is a memory-referencing instruction, it will be dispatched to the memory ordering unit 240 for preparation for access the L1 cache via the L1 cache controller 250.

The write-back bus 255 provides the data path for the L1 cache controller 250 or the execution unit 112 to return the data back to the re-order buffer and the register file 220 and the reservation station 210.

The bus controller 113 provides an interface between the processor 110 and the L2 cache subsystem 132 and the bus 115. The bus controller 113 includes an external bus controller 262 and a backside bus controller 266. The external bus controller 262 provides the interface to the bus 115 to which the memory controller 130 is connected. The backside bus controller 266 provides an interface to the L2 cache subsystem 132 via the backside bus 275.

Figure 3:
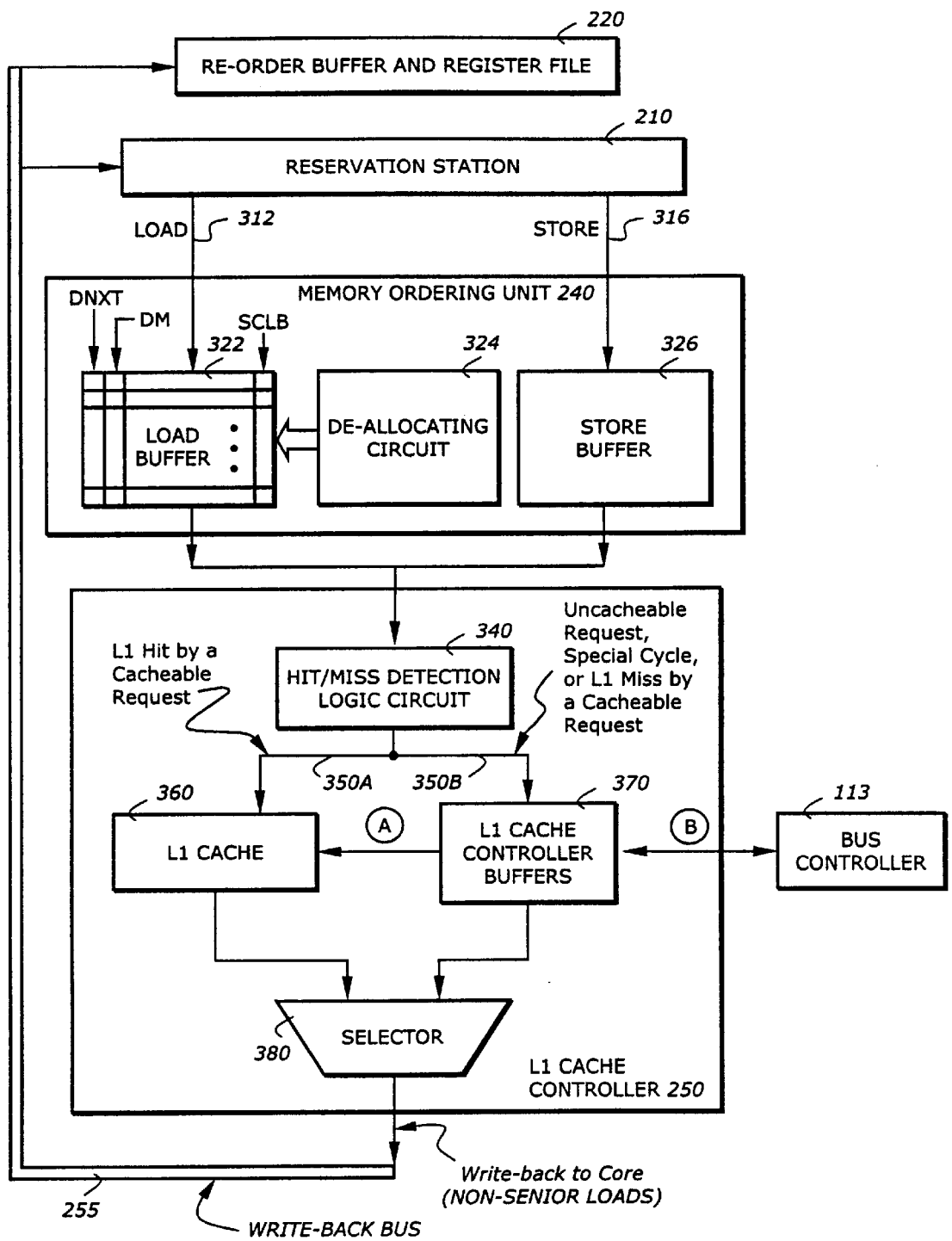
FIG. 3 is a diagram illustrating a relationship and data paths between the reservation unit and the memory control elements according to one embodiment of the invention.

FIG. 3 is a diagram illustrating the relationship and data paths between the reservation station 210 and the various memory control elements, according to one embodiment of the invention. It is assumed that the decoded instructions are memory-referencing instructions.

As shown in FIG. 3, the reservation station dispatches the instruction to the memory ordering unit 240 via the Load Bus 312 or the Store Bus 316 if the instruction is a load or store instruction, respectively. The memory ordering unit 240 includes a load buffer unit 322, a de-allocating circuit 324, and a store buffer unit 326. The load buffer unit 322 receives the load instructions via the load bus 312. The load buffer unit 322 contains a load buffer array. Control bits such as SLCB, DM, and DNXT bits are provided for each buffer entry for maintaining an efficient de-allocation. The de-allocating circuit 324 de-allocates entries in the load buffer unit 322. The operation of the de-allocating circuit 324 and the control bits will be described later. The store buffer unit 326 receives the store instructions via the store bus 316.

Instructions in the load buffer unit 322 and store buffer unit 326 are dispatched to the L1 cache controller 250. The L1 cache controller 250 includes a hit/miss detection logic 340, a L1 cache 360, a L1 cache controller buffer 370, and a write-back selector 380. The hit/miss detection logic 340 detects if the load or store instruction hits the L1 cache or any other L1 cache controller array or buffer structure. If the instruction is a cacheable request and has a L1 hit, the cache access is provided via a bus 350A to the L1 cache 360. If the instruction is an uncacheable request, a special cycle, or cacheable request with a L1 miss, the request is routed to the L1 cache controller buffer 370 via a bus 350B. For a cacheable request with a L1 miss, the missing data is transferred to the L1 cache 360 from the L1 cache controller buffer unit 370 via path A. This data typically comes from the L2 cache or the external memory.

The bus controller 113 services the requests from the L1 cache controller buffer 370 via path B. For cacheable request misses or uncacheable loads, the data flow is from the bus controller 260 to the L1 cache controller buffer 370. For uncacheable stores or writes, the data flow is from the L1 cache controller buffer 370 to the bus controller 113.

For loads, data are written back to the core, i.e., the re-order buffer and register file 220. The write-back data may come from the L1 cache 360 (for cache hits) or the L1 cache controller buffer 370 (for cacheable misses or uncacheable loads). The selector 380 switches between these two write-back sources to the write-back bus 255. The write-back data are then written to the re-order buffer and register file 220 and the reservation station 210 and the write-back data valid bit is written to the re-order buffer.

Figure 4:
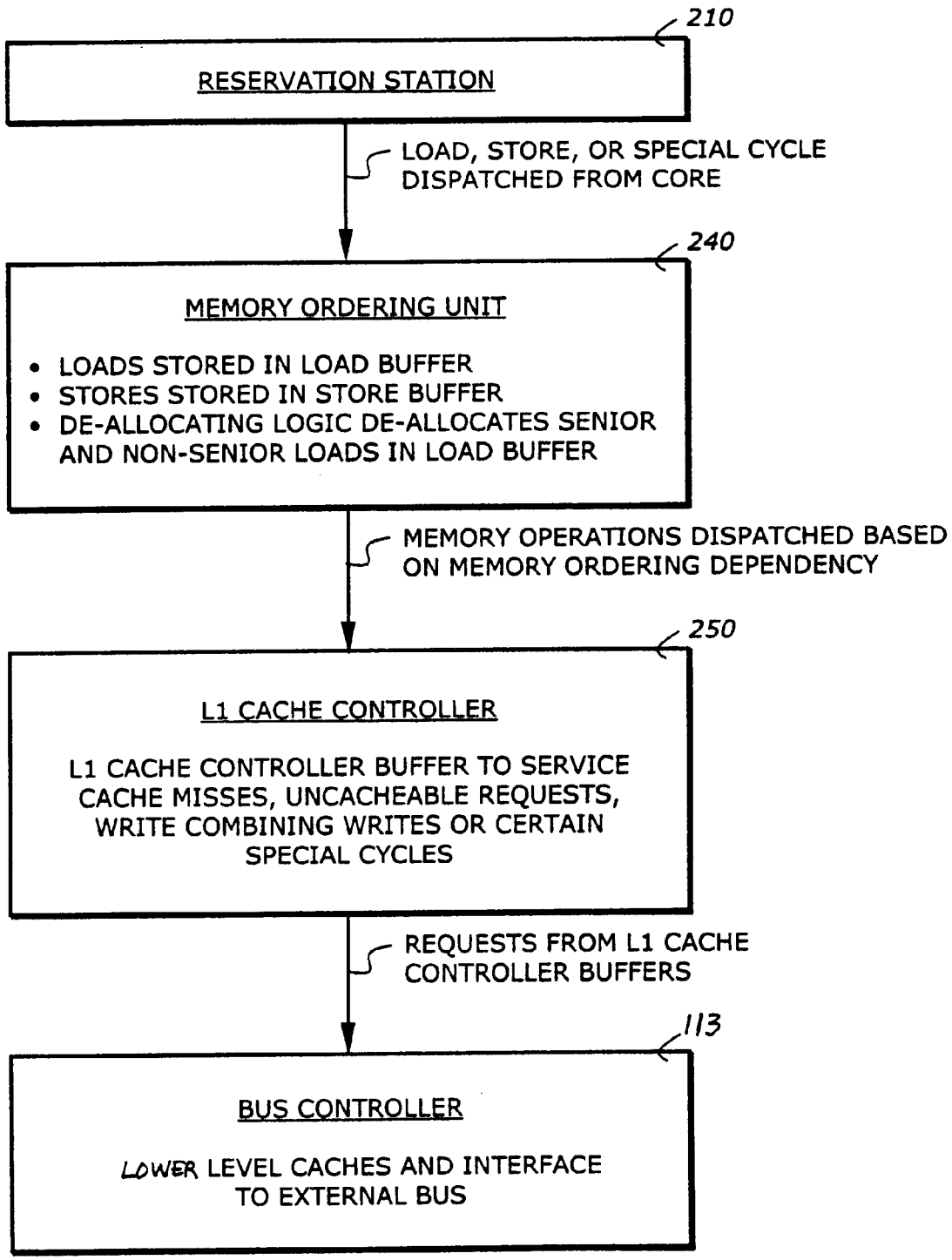
FIG. 4 is a diagram illustrating the data flow between different elements in the processor according to one embodiment of the invention.

FIG. 4 is a diagram illustrating the data flow between different elements in the processor according to one embodiment of the invention. As shown in FIG. 4, the data flow involves the reservation station 210, the memory ordering unit 240, the L1 cache controller 250, and the bus controller 113.

From the reservation station 210 to the memory ordering unit 240, the data flow includes a load, a store, and a special cycle. These data requests are dispatched from the processor core. At the memory ordering unit 240, all loads are stored in the load buffer unit, all stores (or writes) are stored in the store buffer unit. In addition, the de-allocating logic circuit de-allocates senior and non-senior loads in the load buffer.

The memory operations involved in the loads or stores are dispatched from the memory ordering unit 240 to the L1 cache controller 250 based on memory ordering dependencies. At the L1 cache controller 250, the L1 cache controller buffer services cache misses, uncacheable requests, write combining writes, and certain special cycles. The execution of the store fence instruction is considered a special cycle. For cache hits by cacheable operations, the L1 cache is accessed.

If the memory operation is satisfied from the L2 cache or the main memory, the L1 cache controller buffer send requests to the bus controller 113. At the bus controller 113, requests are sent to lower level caches such as the L2 cache, or to the main memory.

THEORY OF THE SENIOR LOAD

As discussed above, all memory-referencing instructions are dispatched from the reservation station to the memory ordering unit (MOU). In the following discussion, load instructions are assumed unless otherwise stated. All load entries are allocated in the load buffer array (e.g., the load buffer 322 as shown in FIG. 3). Non-senior loads are ready for de-allocation in the load buffer in the MOU if they have completed and there is a match between a retirement pointer and a physical destination as will be explained later. The de-allocation is facilitated by maintaining an updateable pointer that points to the next valid entry to be de-allocated in a circular buffer array.

A load instruction is an instruction that transfers data from memory (e.g., L1 cache, L2 cache, or external main memory) to a specified destination in the processor. A "senior" load is a special type of load that can be retired before the data transfer is completed. Therefore, its write-back data to the re-order buffer is meaningless. By retiring the instruction before it is executed, the performance is improved because the delay associated with retiring in the pipeline is reduced. Since the retirement is always in order, the retirement of subsequent non-dependent completed operations is not delayed by an earlier incomplete senior load.

Not all load instructions can be classified as a senior load. One important characteristic of a senior load is that it does not update the architectural register state. In other words, it is a load which does not change the contents of the registers. Because it does not ultimately change the architectural register state, a senior load instruction can be retired before executing. However, early retirement may lead to missing execution in some instances.

Two circumstances may cause the execution of a senior load to be missed. The first circumstance is when there is a mispredicted branch on a subsequent instruction. In this case, if the senior load is retired prematurely (and has not yet started execution), the mispredicted branch will cause clearing of the load buffer in the MOU and reloading with instructions from the new path; therefore, the senior load is de-allocated and is not executed. The second circumstance is when there is a nuke condition on a subsequent instruction. A nuke condition is a condition that causes an exception that may alter the normal program flow. In this case, the same result may occur, i.e., if the senior load is retired too early, it may never get executed because of the change in program flow, which causes the MOU load buffer to be cleared, dropping the senior load execution. A senior load is guaranteed to complete its execution if it has already been accepted by the L1CC.

While different instructions can be classified as a senior load, one exemplary instruction is the PREFETCH instruction. The PREFETCH instruction brings data into a given cache level in anticipation of future use. A hint is associated with the PREFETCH instruction to specify the cache level that the data will be brought into. It is therefore a load because it transfers data from memory to cache. Since it does not change the architectural register state, it can be classified as a senior load. In the discussion that follows, the instruction PREFETCH is used as an example of a senior load. A load (LD) instruction, such as MOVAPS/MOVUPS from memory to register, is a non-senior load. As is known by one skilled in the art, other instructions with similar characteristics as the PREFETCH instruction can be treated as a senior load.

SCENARIOS OF RETIRING SENIOR AND NON-SENIOR LOADS

Figure 5:
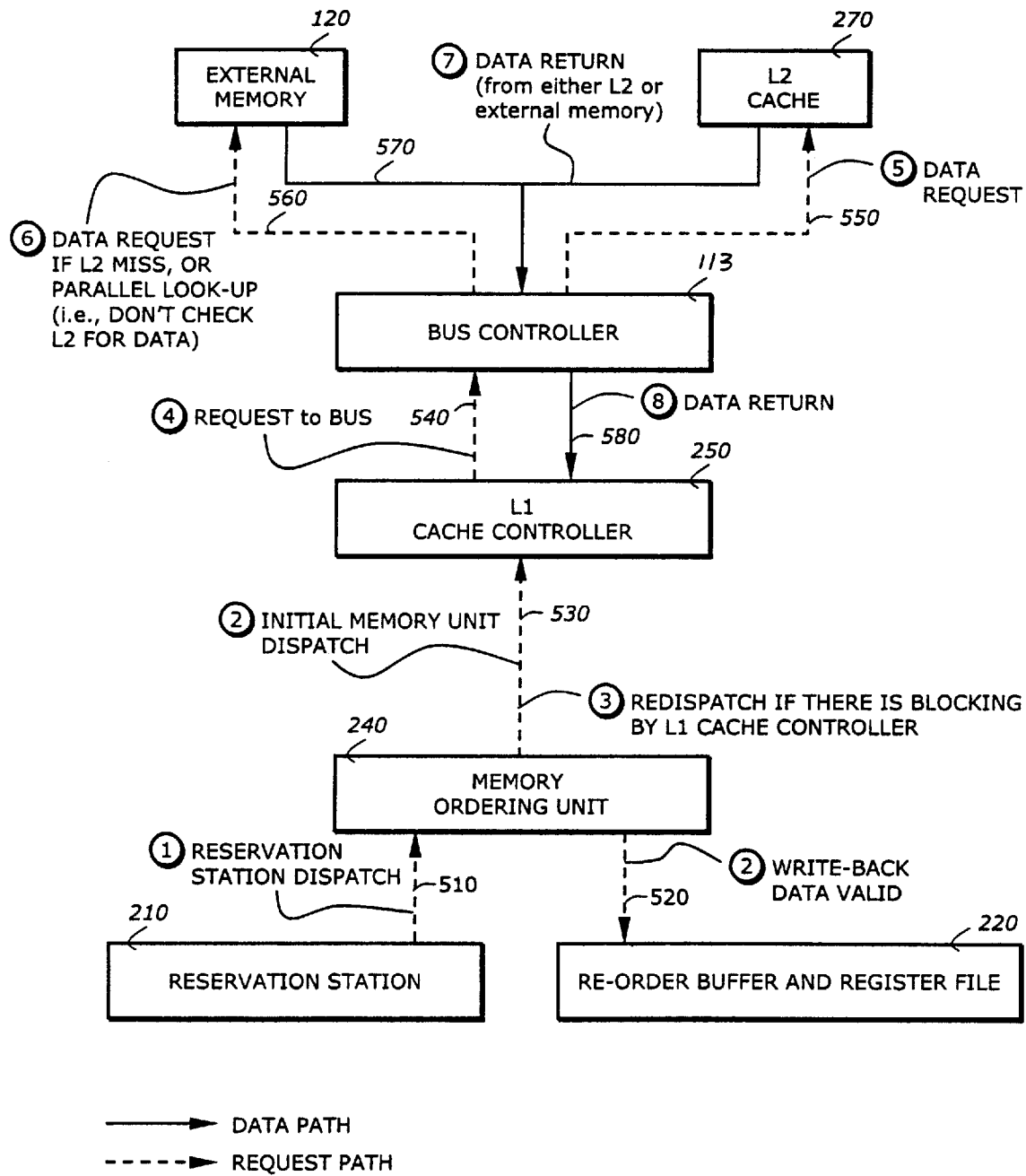
FIG. 5 is a diagram illustrating the control/data flow for a senior load retiring from the memory ordering unit according to one embodiment of the invention.
Figure 6:
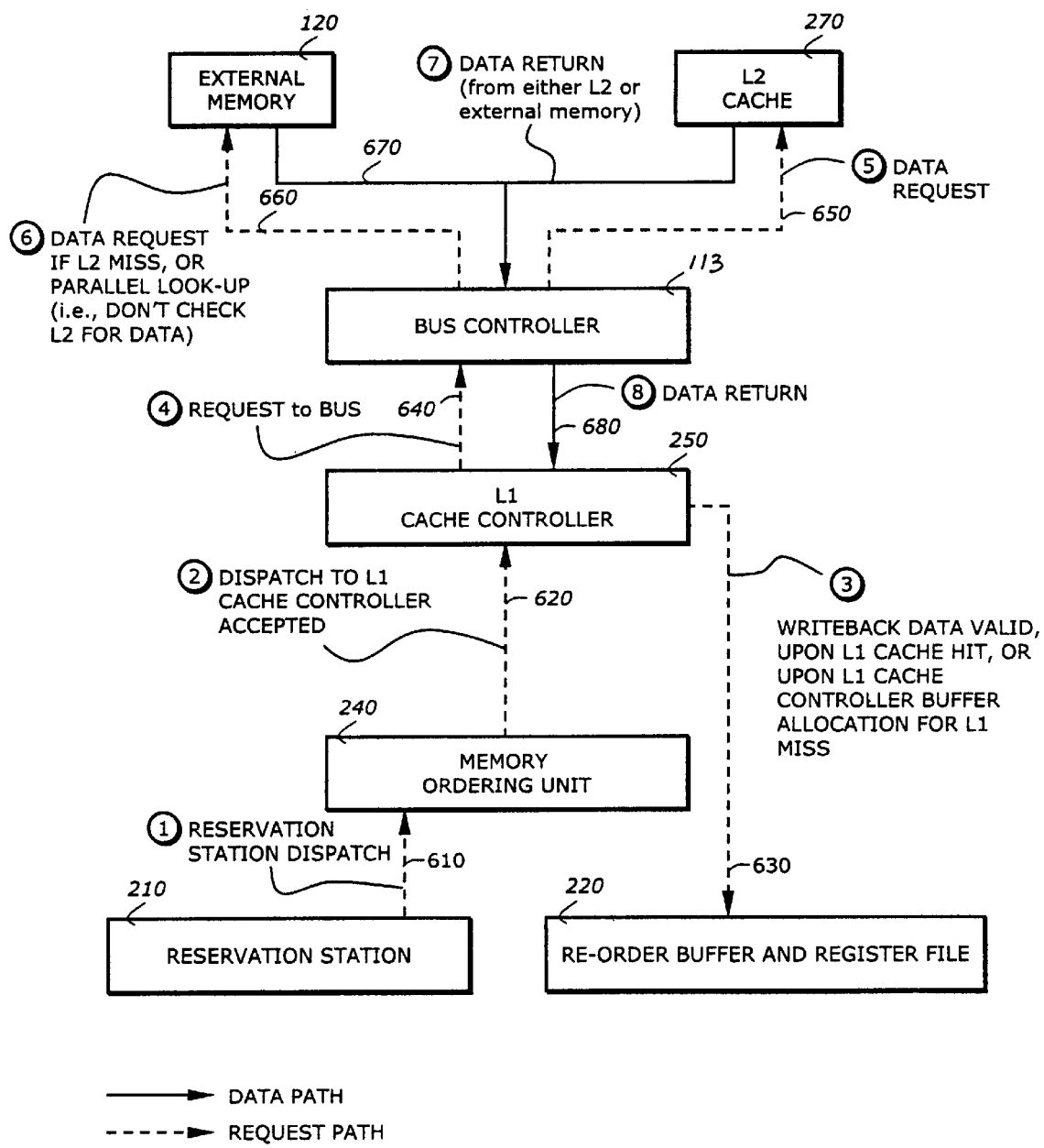
FIG. 6 is a diagram illustrating the control/data flow for a senior load retiring from the L1 cache controller according to one embodiment of the invention.

FIGS. 5 and 6 illustrate two different scenarios for retiring a senior load. In these diagrams, a solid arrow indicates a data path while a broken arrow indicates a request path. The diagram shows a sequence of steps that occurs. The number at each step shows the order of the sequence.

Retiring a Senior Load from the Memory Ordering Unit:

FIG. 5 is a diagram illustrating the data flow for a senior load retiring from the memory ordering unit according to one embodiment of the invention.

At step 1, the reservation station 210 dispatches the request from the senior load to the memory ordering unit 240 via a request path 510.

At step 2, the memory ordering unit 240 sends the initial memory unit dispatch to the L1 cache controller 250 via a request path 530. At the same time, the write-back data valid bit is returned to the re-order buffer and register file 220 via a request path 520. Note that only the data valid bit is returned, not the data itself because the senior load does not change the register state.

If the initial memory request is successful, the process proceeds to step 4. If not, step 3 occurs. At step 3, the request is re-dispatched by the memory ordering unit 240 to the L1 cache controller 250 via the request path 530 if the initial request was not honored, or blocked by the L1 cache controller 250. Depending on the nature of the blocking condition, step 3 is repeated as many times as necessary if the blocking condition persists until the request is honored by the L1 cache controller 250, or the request is suspended and is redispatched once the L1CC 250 indicates that the blocking condition has been removed. Note, however, that the write-back data valid bit is sent to the re-order buffer only once.

At step 4, the request to the bus is sent from the buffer in the L1 cache controller 250 to the bus controller 113 via a request path 540.

At step 5, the data request is sent from the bus controller 113 to the L2 cache 270 via a request path 550. If there is a L2 cache hit, the requested data is returned from the L2 cache 270 to the bus controller 113 at step 7 via a data path 570. The bus controller 113 then forwards the returned data at step 8 to the L1 cache controller via a data path 580. However, if there is a L2 cache miss, or if parallel look-up is performed, i.e., if L2 cache access is bypassed, the bus controller 113 sends the request at step 6 to the external memory 120 via a request path 560. The requested data is then returned from the external memory 120 to the bus controller via data path 570 at step 7. Step 8 then follows similarly. The data is transferred from the L1CC buffer to a cache level as specified in the PREFETCH hint.

In the scenario of FIG. 5, the senior load is retired from the memory ordering unit 240 before it is executed. The instruction is ready for retirement at step 2 when the memory ordering unit 240 sends the write-back data valid bit to the re-order buffer and register file 220. After step 2, the request is set in motion and the chain of events (steps 3, 4, 5, 6, 7, and 8) takes place without further blocking retirement of subsequent completed instructions in the re-order buffer and register file 220.

To avoid multiple retirements of the same senior load instruction, the L1CC masks the write-back data valid signal to the re-order buffer and register file 220. The MOU drives this signal in step 2. This is not the case for non-senior loads.

Retiring a Senior Load from the L1 Cache Controller:

Although the scenario depicted in FIG. 5 provides the relatively good performance, the mispredicted branch and nuke conditions may cause dropping senior load execution in a few instances. A less efficient approach that avoids the problem caused by mispredicted branch and nuke conditions is to retire the senior load in the L1 cache controller 250 rather than in the memory ordering unit 240. In this case, the execution of the senior load is guaranteed.

FIG. 6 is a diagram illustrating the data flow for a senior load retiring from the L1 cache controller 250 according to one embodiment of the invention.

At step 1, the reservation station 210 dispatches the request from the senior load to the memory ordering unit 240 via a request path 610.

At step 2, the memory ordering unit 240 sends the initial memory unit dispatch to the L1 cache controller 250 via a request path 620. This step is repeated until the request is accepted by the L1 cache controller 250.

At step 3, the write-back data valid bit is returned to the re-order buffer and register file 220 via a request path 630. This write-back data valid bit indicates that there is a L1 cache hit, or there is a L1 cache miss but the L1 cache controller allocates its buffer for receiving the requested data. As in FIG. 5, the write-back data is not sent because the register state is not updated.

At step 4, the request to the bus controller is sent from the L1 cache controller 250 to the bus controller 113 via a request path 640.

At step 5, the data request is sent from the bus controller 113 to the L2 cache 270 via a request path 650. If there is a L2 cache hit, the requested data is returned from the L2 cache 270 to the bus controller 113 at step 7 via a data path 670. The bus controller 113 then forwards the returned data at step 8 to the L1 cache controller via a data path 680. However, if there is a L2 cache miss, or if parallel look-up is performed, i.e., if L2 cache access is bypassed, the bus controller 113 sends the request at step 6 to the external memory 120 via a request path 660. The requested data is then returned from the external memory 120 to the bus controller via data path 670 at step 7. Step 8 then follows similarly.

In the scenario of FIG. 6, the senior load writes back its data valid bit from the L1 cache controller 250 before it is executed. The instruction is ready for retirement at step 3 when the L1 cache controller 250 sends the write-back data valid bit to the re-order buffer and register file 220. After step 3, the request is set in motion and the chain of events (steps 4, 5, 6, 7, and 8) takes place without further blocking retirement of subsequent completed instructions.

Retiring the senior load from the L1 cache controller 250 does not provide a performance as good as retiring from the memory ordering unit 240 because the L1CC may block the initial MOU dispatch. There is no performance degradation if the initial MOU dispatch is accepted by the L1CC. However, it has an advantage that it guarantees the execution of the senior load because the L1 cache controller 250 has accepted the senior load request, and provided a L1 cache hit or buffered it in the L1CC buffer, in case of a L1 cache miss.

Compared to non-senior loads, retiring senior loads from the L1 cache controller does not offer performance improvement in the case of a L1 cache hit because there is no latency between sending the write-back data valid bit to the re-order buffer and register file 220 and the completion of the execution. However, for a L1 cache miss, retiring senior loads from the L1 cache controller provides better performance than non-senior loads as will be explained in the following.

For a L1 cache miss, a senior load is retired upon allocation into the L1 cache controller buffer that is responsible for servicing the cache miss. In other words, the senior load can be retired immediately after a L1 cache miss because the L1 cache controller buffer is allocated to receive the requested data. On the other hand, a non-senior load has to wait for the completion of the load, i.e., it has to wait for the requested line to be returned from the bus controller, in order to be retired (the requested data will be used to update the register state).

To avoid multiple retirements of the same senior load instruction (which has already been allocated upon allocation of the L1 cache controller buffer), the L2 cache bypass writebacks of senior loads are masked for L1 cache misses. The "L2 cache bypass write-back" is when the L2 returns the requested data to the L1CC buffer (i.e., L1miss/L2hit), and simultaneously the write-back data bus is available and the write-back data valid signal to the re-order buffer is asserted.

For senior load retirement from the L1CC 250, the L1CC 250 asserts the write-back data valid signal upon L1 cache hit or upon L1 buffer allocation (if there is a L1 cache miss), and not upon the return of the requested data. On the other hand, for a senior load L1 cache miss, the L1CC masks (i.e., clears) the write-back data valid signal upon the return of the requested data. The write-back masking also avoids contention on the writeback bus with another instruction. This is implemented by masking (i.e., clearing) the write-back data valid signal to the re-order buffer and register file 220. The L1 cache controller 250 retires all non-senior loads by asserting the write-back data valid signal when the requested data is available.

LOAD BUFFER ARRAY IN THE MEMORY ORDERING UNIT

As shown in FIG. 3, the load buffer array 322 stores load instructions while the store buffer unit 326 stores store (or write) instructions that are dispatched to the memory ordering unit 240. The load buffer array 322 is implemented as a buffer array holding a number of entries representing the load instructions. In one embodiment, the number of entries in the load buffer array is 16.

To support the implementation of the senior load, the load buffer array is provided with control bits.

Senior Load Control Bit:

A senior load control bit (SLCB) is assigned to each entry in the load buffer array. The SLCB is designed to help tracking the completion and the retirement of senior loads. The SLCB is set when the senior load is first dispatched to the L1 cache controller, signifying that the write-back bus has been granted. At that time, the senior load is considered retired by the memory subsystem (i.e., write-back data valid bit is sent to the re-order buffer and register file 220). If the dispatch is blocked by the L1 cache controller or an external abort condition, the SLCB remains set to indicate that no retirement signal (i.e., write-back data valid bit to the re-order buffer and register file 220) should be sent on subsequent dispatches to the L1 cache controller as shown in step 3 of FIG. 5. The SLCB is cleared when the senior load is de-allocated from the load buffer array; i.e., when the senior load is dispatched and accepted by the L1 cache controller and the tail pointer is pointing to the senior load entry (as will be explained later). Since SLCB is relevant only for senior loads, it remains always cleared for non-senior load entries.

De-allocation Logic:

De-allocation of the load buffer array is a process in which an entry in the array is marked "no longer in use" so that a new entry can be written over.

De-allocation is related to retirement in that if an entry is de-allocated, then it is retired or it must have been already retired from the re-order buffer. However, an entry ready for retirement may not be de-allocated yet. This is because while execution is out of order, de-allocation and retirement are in order. For example, a senior load may be retired, but de-allocation in the load buffer is blocked at least until the execution is guaranteed (i.e., is accepted by the L1CC).

One simple way to implement the de-allocation logic is to maintain a circular pointer, referred to as a tail pointer (TP), that points to the next entry to be de-allocated. When the TP reaches the last entry, it advances by wrapping around the load buffer in a circular fashion. The circular pointer points to the next entry to be de-allocated and advances every time the subsequent entry (entries) is (are) de-allocated. In one embodiment, up to three micro-operation (uOps) can be retired in a single cycle. Therefore, up to three entries can be de-allocated in a single cycle.

When a non-senior load is ready to retire (i.e., when the requested data is written back to the core), the L1CC sends a write-back data valid signal to the re-order buffer and register file to indicate that the write-back data is valid. The re-order buffer and register file ensures that instructions are retired in program order despite their possible out-of-order execution and completion.

In one embodiment, each entry in the load buffer is associated with a Physical Destination (PDST) identifier. The PDST identifier indicates the entry number in the re-order buffer. Every time a new entry enters the buffer, the PDST identifier is updated. When the entry is dispatched from the decoding unit to the reservation station, it also enters the re-order buffer and it is assigned a PDST. Upon dispatching the operation to the MOU, the new load buffer entry receives the same PDST as in the re-order buffer.

Figure 7:
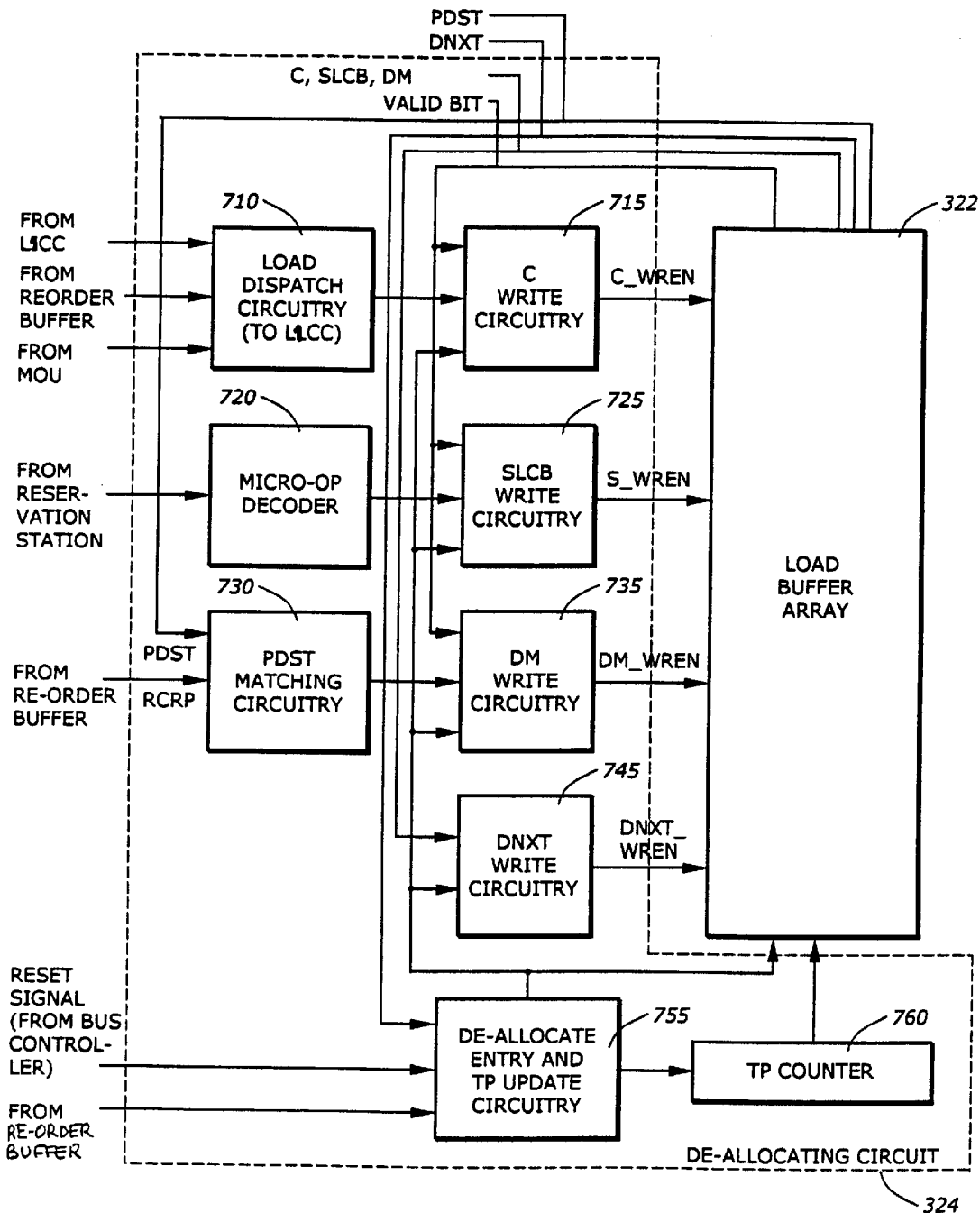
FIG. 7 is a diagram illustrating one embodiment of the de-allocating logic circuit and the load buffer array according to one embodiment of the invention.

FIG. 7 is a diagram illustrating the de-allocating circuit 324 according to one embodiment of the invention. The de-allocating circuit 324 is coupled to the load buffer unit 322 to de-allocate the buffer array. As is known by one skilled in the art, the de-allocating circuit 324 shown in FIG. 7 is only for illustrative purposes. Alternative implementations of the de-allocating circuit 324 are possible. The de-allocating circuit 324 includes a load dispatch circuit 710, a C write circuit 715, a micro-op decoder 720, an SLCB write circuit 725, a PDST matching circuit 730, a DM write circuit 735, a DNXT write circuit 745, a de-allocate entry and TP update circuit 755, and a TP counter 760.

The load dispatch circuit 710 issues load instructions to the L1CC. It receives information from other logic structures within the MOU to determine when all memory ordering constraints are clear (i.e., load/store buffer dependencies) so that the next available load can be dispatched to the L1CC. It also receives the "nuke" information from the re-order buffer to determine whether the dispatch should be cancelled. It also receives blocking information from the L1CC to determine whether a given load should be re-dispatched at a later time (i.e., if blocked by the L1CC). The result of the dispatch is passed on to the C write circuit 715, where it is qualified with the entry valid bit for the corresponding load buffer entry in the load buffer array 322. If the entry is valid and the dispatch to the L1CC is successful (i.e., it is not nuked or blocked by the L1CC), the complete bit is set in the corresponding entry in the load buffer array; otherwise, it remains cleared. The C write circuit 715 is also enabled to clear the complete bit upon de-allocation of the corresponding load buffer entry.

The micro-op decoder 720 in the MOU receives opcode information from the reservation station. It decodes the type of instruction. If it is a senior load (e.g., a prefetch micro-opcode), the SLCB write circuit 725 qualifies this information with the entry valid bit for the corresponding load buffer entry in the load buffer array 322. If the entry is valid and the incoming instruction is a senior load, the SLCB is set in the corresponding entry in the load buffer array 3222; otherwise, it remains cleared. The SLCB write circuit 725 is also enabled to clear the SLCB upon de-allocation of the corresponding load buffer entry.

The PDST matching circuit 730 matches the PDST from the load buffer entries in the load buffer array with the RBRP received from the re-order buffer. If they match, the DM write circuit 735 qualifies this information with the entry valid bit for the corresponding load buffer entry in the load buffer array, and the DM bit for that entry is set; otherwise, it remains cleared. The DM write circuit 735 is also enabled to clear the DM bit upon de-allocation of the corresponding load buffer entry.

The DNXT write circuit 745 receives the C, SLCB, and DM bits from each load buffer array entry to determine which entries are ready to be de-allocated. If ready for de-allocation, the corresponding DNXT bit is set; otherwise, it remains cleared. The DNXT write circuit 745 is also enabled to clear the DNXT bit upon de-allocation of the corresponding load buffer entry.

The de-allocating entry and TP update circuit 755 receives the DNXT bit information from the load buffer array 322, the reset signal, and the "nuke" information from the re-order buffer. Upon reset or a "nuke" condition, all entries in the load buffer array 322 are cleared and de-allocated. If the TP is pointing to consecutive entries with the DNXT bit set, those entries are de-allocated (i.e., the control fields, such as valid, complete, senior load, DM and DNXT bits are cleared), and the TP is updated (i.e., advances to first entry with a wrap-around mechanism that is incremented as the corresponding load buffer entries are de-allocated.

When the re-order buffer and register file is retiring a load, it sends a Re-order Buffer Retirement Pointer (RBRP) to the memory ordering unit. This implies that the re-order buffer must have previously received the write-back data valid bit. All the load buffer entries are matched against this retirement pointer.

A De-allocate Match (DM) bit is assigned to each entry to indicate the matching result. Any non-senior load entry that matches the RBRP from the re-order buffer and register file will set the DM bit. The entries are then ready for de-allocation after further examination of additional conditions. The equivalent of the DM bit for the senior loads is the complete bit, which is set when the L1CC accepts the MOU dispatch of any load.

The reason why the DM bit alone cannot guarantee a proper retirement is that it does not guarantee that a senior load has completed execution. An example to illustrate this point is in order. As shown in FIG. 5, step 2 includes a dispatch from the memory ordering unit 240 to the L1 cache controller 250. At the same time, a write-back data valid bit is returned to the re-order buffer and register file 220. When the re-order buffer and register file 220 receives the write-back data valid signal, it is ready to retire the senior load. However, it is possible that the L1 cache controller 250 has not accepted the dispatch. The memory ordering unit 240 has to re-dispatch the request again in step 3 until the L1 cache controller 250 accepts it. If the re-order buffer and register file sends a retirement pointer to the memory ordering unit 240, and the load buffer entry for the pending senior load matches this retirement pointer, the corresponding DM bit for this senior load entry would have been set, if used for all loads. At this point, de-allocating this senior load, if pointed to by the TP would stop the re-dispatch of the senior load in step 3. Therefore, the senior load would never be executed.

To avoid this undesirable effect, the complete bit is used to de-allocate senior load entries. The complete bit indicates that the request has been accepted by the L1CC; therefore, although an instruction might have not yet completed its execution, it is guaranteed that it will eventually complete execution (i.e., there is a L1 cache hit, or if there is a L1 miss, a L1CC buffer is allocated to service the miss).

Consequently, a senior load is ready to be de-allocated when the following two conditions are met: (1) the request is accepted by the L1CC, i.e., the complete bit is set, and (2) it is a senior load entry; i.e., the SLCB bit is set. In contrast, a non-senior load is ready to be de-allocated when the following two conditions are met: (1) its DM bit is set; i.e., there is/was a match between RBRP and FDST, and (2) it is not a senior load entry; i.e., the SLCB bit is cleared.

Senior loads with the complete bit cleared and non-senior loads with the DM bit cleared block the TO, preventing it from advancing further. This is necessary to ensure in-order de-allocation in an out-of-order execution machine.

To facilitate de-allocation in the MOU load buffer, a new control bit per entry named "De-allocation Next" (DNXT) bit is used to indicate which entries are ready to be de-allocated. This bit is set for senior load entries with the complete bit set or non-senior load entries with the DM bit set. An entry cannot be de-allocated if it does not have it DNXT bit set; therefore, stalling the TP from advancing. In hardware, the DNXT bit is the logical equation: ((SLCB AND C) OR (NOT (SLCB) AND DM)); where C=complete bit, SLCB=senior load control bit and DM=de-allocate match.

The DNXT bit could be set for several load buffer entries based on the above logical equation applied to each entry. Its algorithm allows for simultaneous de-allocation of up to "n" load buffer entries per cycle, where "n" is the total number of load buffer entries in the load buffer array; i.e., if TP points to entry 0, and DNXT bit is set for all n entries, all of them can be de-allocated in a single cycle. In the embodiment described in FIGS. 9 and 10, it is assumed that a maximum of three entries are de-allocated per cycle.

FIGS. 8A through 8F illustrate six scenarios for the load buffer array in the memory ordering unit. The RBRP is the Re-order Buffer Retirement Pointer. In the diagram, LD stands for non-senior load, and PREFETCH is a senior load. The PDST column refers to the Physical Destination. If the PDST field matches the RBRP, the DM bit is set. The notation 1/- indicates that the entries for corresponding instructions are 1 and don't cares, respectively. C is a Complete bit. When C is set, it means that the corresponding load has been accepted by the L1 cache controller (but may not be completed). The SLCB is the senior load control bit as discussed before. All FIGS. 8A–8F assume that the entries in the load buffer are valid.

Figure 8A:
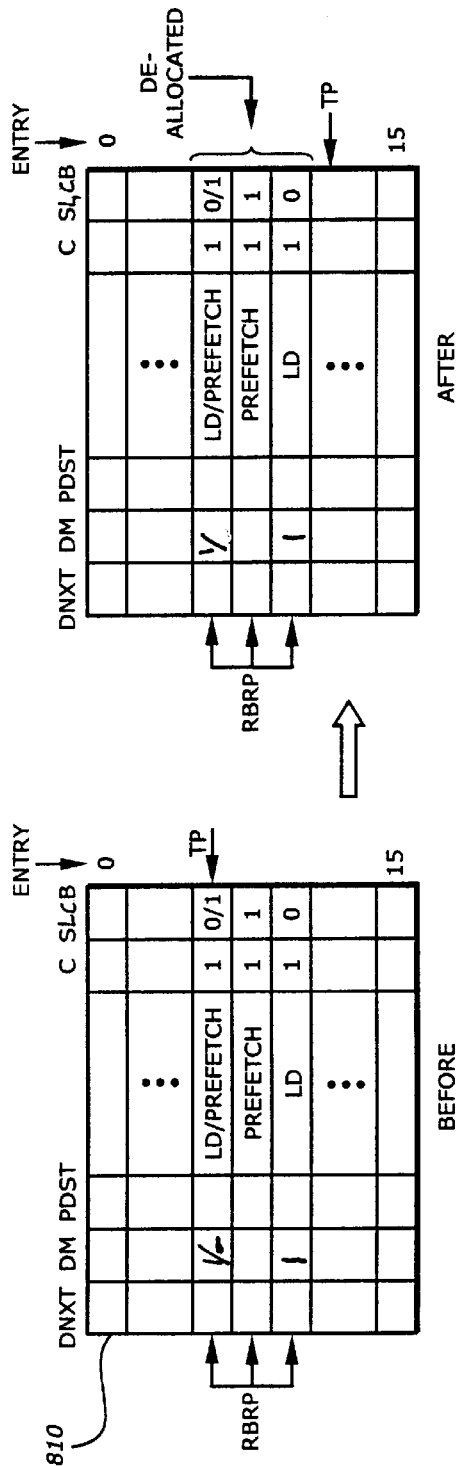
FIG. 8A is a diagram illustrating a scenario in which a PREFETCH follows a LD or another PREFETCH and precedes another LD according to one embodiment of the invention.

FIG. 8A shows a scenario in which a PREFETCH follows a LD or another PREFETCH and precedes another LD, according to one embodiment of the invention. In this scenario, all three loads have been accepted by the L1 cache controller (their C bit is set). The SLCB bits for both PREFETCH instructions are set indicating that they are retired senior loads by the memory subsystem. The three instructions can then be de-allocated and the TP advances to point to the next entry, assuming that the retirement and the de-allocation are implemented for three instructions per cycle, as discussed earlier.

Figure 8B:
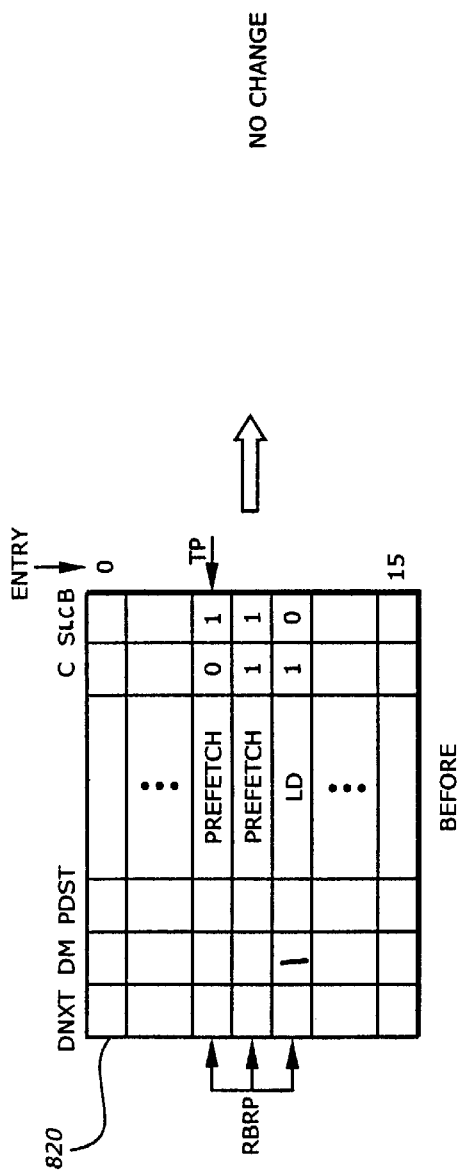
FIG. 8B is a diagram illustrating a scenario in which the TP points to a PREFETCH which has not been completed according to one embodiment of the invention.

FIG. 8B shows a scenario in which the TP points to a PREFETCH which has not been completed (the C bit is zero), according to one embodiment of the invention. This entry is followed by another PREFETCH and a LD. Both the later PREFETCH and the LD have their C bit set, signifying that they have been completed. This scenario may occur when the first PREFETCH was dispatched but not accepted by the L1 Cache Controller (e.g., hardware resources are not free in the L1CC). Then the second PREFETCH was dispatched and accepted by the L1 cache controller (perhaps thanks to a cache hit). In this case, although the second PREFETCH and the LD are ready to retire, their entries in the buffer cannot be de-allocated because the de-allocation is in program order. Therefore, the TP does not advance and stays unchanged until the first PREFETCH is complete.

Figure 8C:
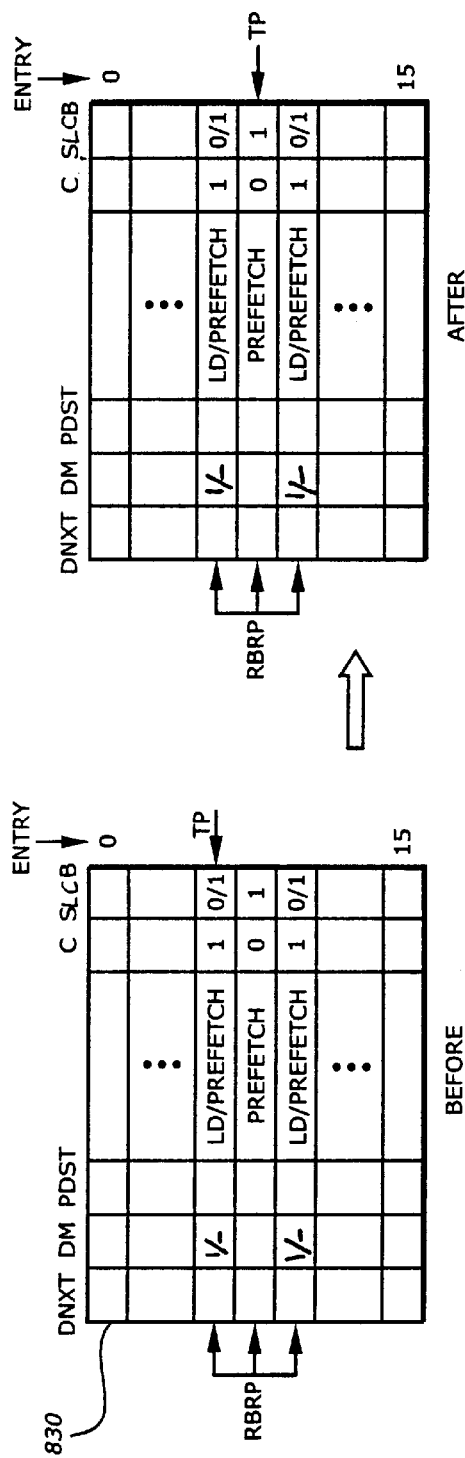
FIG. 8C is a diagram illustrating a scenario in which a LD or PREFETCH was completed, the second PREFETCH is not completed, and the next LD or PREFETCH has been completed, according to one embodiment of the invention.

FIG. 8C shows a scenario in which a LD or PREFETCH was completed (the C bit is set), the second PREFETCH is not completed, and the next LD or PREFETCH has been completed, according to one embodiment of the invention.

In this scenario, the first and third LD or PREFETCH can be de-allocated because the PREFETCH has its complete bit set, or the LD has its DM bit set. The PREFETCH in the middle, however, cannot be de-allocated because it has not been completed. The TP therefore advances to point to this entry. The TP does not advance to point to the next LD or PREFETCH because de-allocation is in program order. The uncompleted PREFETCH blocks the TP.

Figure 8D:
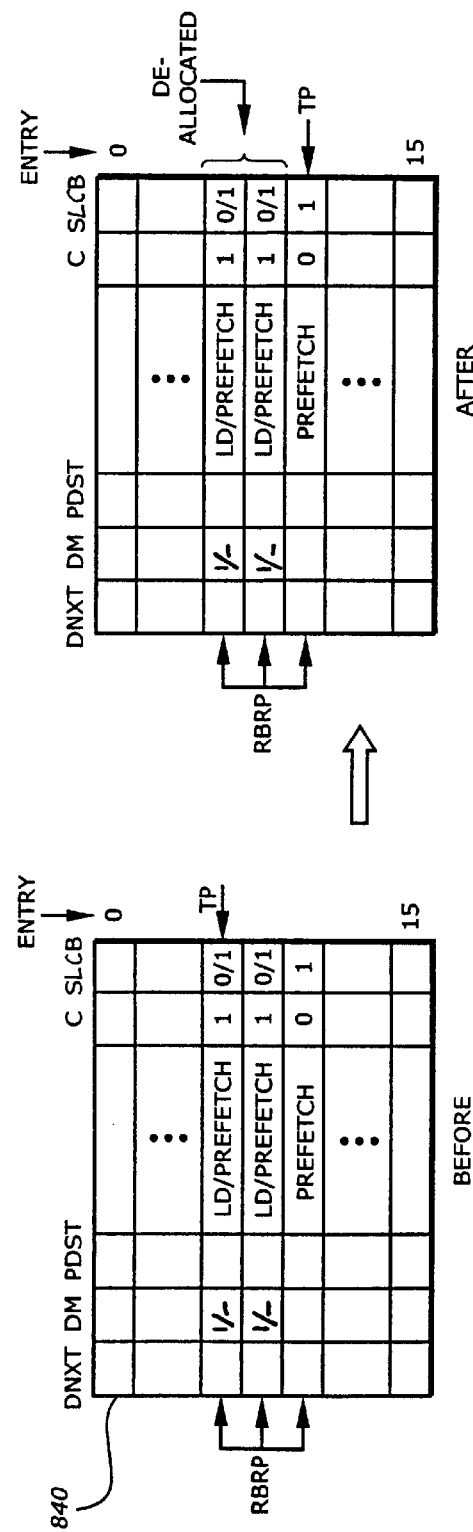
FIG. 8D is a diagram illustrating a scenario in which the first two LD or PREFETCH have been completed and their DM bits are set (for LD) but the last PREFETCH has not been completed, according to one embodiment of the invention.

FIG. 8D shows a scenario in which the first two LD or PREFETCH have been completed and the DM bit is set (for LD) but the last PREFETCH has not been completed, according to one embodiment of the invention. The TP, therefore, only advances two entries and points to the uncompleted PREFETCH.

FIG. 8E shows a scenario in which three LD/PREFETCH entries have been completed and the DM bit is set (for LD), according to one embodiment of the invention. The TP, therefore, advances past through all three and points to the next entry because all three LD/PREFETCH entries can be de-allocated in a single cycle.

FIG. 8F shows a scenario in which the first PREFETCH has not been completed, according to one embodiment of the invention. This uncompleted PREFETCH entry blocks all the entries following it. The TP, therefore, remains unchanged, pointing to the uncompleted PREFETCH.

Note that non-senior load entries with the C bit set cannot be de-allocated until RBRP=PDST, i.e., until the DM bit is set.

Figure 9:
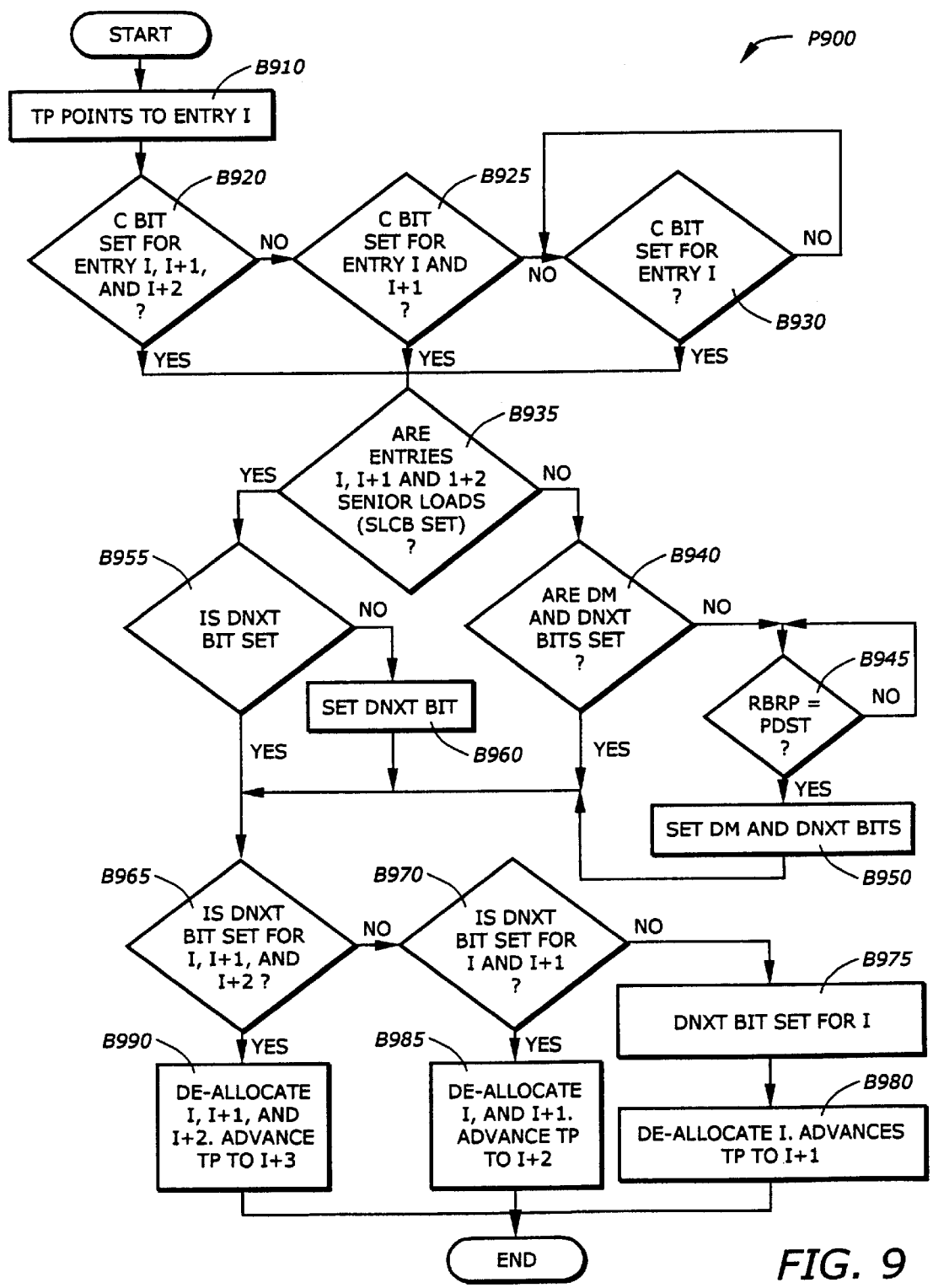
FIG. 9 is a flowchart illustrating the process of de-allocating load entries in the load buffer array, according to one embodiment of the invention.

FIG. 9 is a flowchart illustrating the process S900 of de-allocating instruction entries in the load buffer array according to one embodiment of the invention.

From START, the process P900 enters block B910 where the tail pointer (TP) points to the buffer entry i. The process P900 then enters block B920 to determine if the entries i, i+1, and i+2 have their respective C bits set. If NO, the process P900 enters block B925. If YES, the process P900 enters block B925. In block B925, it is determined if the entries i and i+1 have their respective C bits set. If NO, the process P900 enters block B930. If YES, the process P900 enters block B935. In block B930, it is determined if the entry i has its C bit set. If NO, the process returns to block B930. If YES, the process P900 enters block P935. At this point, the entries having their corresponding C bit set are valid.

In block B935, it is determined if those entries having the C bits set from i, i+1, and i+2 are senior loads, i.e., if their SLCB bit is set. If NO, the process enters block B940. If YES, the process enters block B955. In block B940, it is determined if both the DM and DNXT bits of the corresponding entry/entries are set. If NO, the process P900 enters block B945. If YES, the process enters block B965. In block B945, it is determined if RBRP is equal to PDST. If NO, the process returns to block B945 waiting for a match between the retirement pointer and the pointer destination of that entry. If YES, the process P900 sets both the DM and DNXT bits of that entry and then proceeds to block B965.

In block B955, it is determined if the DNXT of the corresponding entry is set. If NO, the process P900 enters block B960 to set the DNXT bit. IF YES, the process P900 enters block B965.

In block B965, it is determined if the consecutive entries i, i+1, and i+2 have their respective C bits set. If NO, the process P900 enters block B970. If YES, the process P900 enters block B990. In block B970, it is determined if the consecutive entries i and i+1 have their respective DNXT bits set. If NO, the process P900 enters block B975. If YES, the process P900 enters block B985. In block B975, the process P900 sets the DNXT bit for the entry i and then enters block B980 to de-allocate the entry i and advance the TP to point to the next entry i+1. The process P900 then terminates. In block B985, the process P900 de-allocates the entries i and i+1 and advances the TP to point to the next entry i+2. The process P900 then terminates. In block B990, the process P900 de-allocates the consecutive entries i, i+1, and i+2, and then advances the TP to point to the entry i+3. The process P900 then terminates.

The implementation of a senior load type of instruction, therefore, improves performance by reducing the stalls in the pipeline due to late retirement. By incorporating a control mechanism with a de-allocation logic, the retirement of load instructions is efficient.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of improving instruction execution performance in a processor, the method comprising:
    decoding an instruction in the processor, the instruction decoding into a load instruction requesting a memory reference associated with a memory;
    responsive to decoding the load instruction, dispatching the load instruction to a memory ordering unit in the processor, the memory ordering unit determining the load instruction is a senior load instruction and storing the senior load instruction into a load buffer;
    responsive to storing the senior load instruction, retiring the senior load instruction in order prior to execution of the senior load instruction so that other instructions can execute and retire before and without waiting for the senior load instruction to execute; and
    responsive to retiring the senior load instruction, executing the senior load instruction out of order in the processor after said retiring of the senior load instruction in order.

2. The method of claim 1 further comprises:
    responsive to retiring the senior load instruction,
    sending a request of the memory reference to a memory controller; and
    de-allocating an entry in the load buffer representing the senior load instruction after retirement and prior to execution of the senior load instruction.

3. The method of claim 1 wherein said retiring of the senior load instruction includes
    returning a write-back data valid bit to a re-order buffer.

4. The method of claim 3 further comprises:
    sending a retirement pointer from the re-order buffer to the memory ordering unit;
    matching the retirement pointer with a pointer destination associated with the entry representing the retired senior load instruction in the load buffer which was accepted by a cache controller; and
    updating a tail pointer to point to a next entry in the load buffer.

5. The method of claim 2 wherein the load buffer is in the memory ordering unit.

6. The method of claim 2 wherein the load buffer is in the memory controller.

7. The method of claim 1 wherein the senior load instruction requests to load data from the memory without updating contents of registers in the processor.

8. The method of claim 1 wherein
    the senior load instruction is a type of load instruction that can be retired before data transfer is completed.

9. The method of claim 1 wherein the load buffer includes a senior load control bit associated with the load instruction, and
    the load buffer storing one or more entries of load instructions within the processor.

10. The method of claim 9 wherein
    the senior load control bit is set to indicate that a write-back valid bit has been sent to a re-order buffer and that the senior load instruction is ready to be retired.

11. The method of claim 10 wherein
    the senior load control bit is cleared to indicate that the senior load instruction has been accepted by a cache controller for execution.

12. An instruction execution apparatus for improved instruction execution, the instruction execution apparatus including:
    a decoder to decode instructions including a load instruction, the load instruction requesting a memory reference associated with a memory;
    a memory ordering unit coupled to the decoder to receive the load instruction dispatched from the decoder to the memory ordering unit and to determine that the load instruction is a senior load instruction;
    a load buffer to store the senior load instruction, the senior load instruction to be retired in order and prior to its execution so that other instructions can execute and retire before and without waiting for the senior load instruction to execute; and
    the instruction execution apparatus to execute the senior load instruction out of order after the senior load instruction is retired in order.

13. The instruction execution apparatus of claim 12 further including:
    a memory controller to receive a request of the memory reference after the senior load instruction is retired; and
    a de-allocating circuit coupled to the load buffer to de-allocate an entry in the load buffer representing the senior load instruction after retirement and prior to execution of the senior load instruction.

14. The instruction execution apparatus of claim 13 further including:
    a re-order buffer coupled to the decoder, the re-order buffer to receive a write-back data valid bit returned from the memory ordering unit prior to the senior load instruction being retired in order; and
    a reservation station coupled between the memory ordering unit and the decoder, the reservation station to dispatch the load instruction to the memory ordering unit.

15. The instruction execution apparatus of claim 14 wherein the de-allocating circuit further comprises:
    a matching circuit to match a retirement pointer with a pointer destination associated with the entry in the load buffer, the retirement pointer being sent from the re-order buffer to the memory ordering unit; and
    an updating circuit to update a tail pointer to point to a next entry in the load buffer.

16. The instruction execution apparatus of claim 12 wherein the load buffer is in the memory ordering unit.

17. The instruction execution apparatus of claim 12 wherein the load buffer is in a memory controller.

18. The instruction execution apparatus of claim 12 wherein the memory ordering unit further to determine if the load instruction requests to load data from the memory without updating contents of registers in the instruction execution apparatus.

19. The instruction execution apparatus of claim 12 wherein
the senior load instruction is a type of load instruction that can be retired before data transfer is completed.

20. The instruction execution apparatus of claim 12 further comprising:
a re-order buffer to receive a write-back data valid signal to retire the senior load instruction in order.

21. The instruction execution apparatus of claim 12 wherein
the load buffer includes a senior load control bit associated with the load instruction, and
the load buffer to store one or more entries of load instructions within the instruction execution apparatus.

22. The instruction execution apparatus of claim 21 wherein
the senior load control bit is set to indicate that a write-back valid bit has been sent to a re-order buffer and that the senior load instruction is ready to be retired.

23. The instruction execution apparatus of claim 22 wherein
the senior load control bit is cleared to indicate that the senior load instruction has been accepted by a cache controller for execution.

24. A microprocessor including:
a decoder to decode a load instruction, the load instruction requesting a memory reference associated with a memory;
a memory ordering unit coupled to the decoder to receive the load instruction dispatched from the decoder to the memory ordering unit and to determine that the load instruction is a senior load instruction;
a load buffer to store the senior load instruction, the senior load instruction to be retired in order and prior to its execution so that other instructions can execute and retire before and without waiting for the senior load instruction to execute; and
the microprocessor to execute the senior load instruction out of order after the senior load instruction is retired in order.

25. The microprocessor of claim 24 further including:
a memory controller to receive a request of the memory reference after the senior load instruction is retired; and
a de-allocating circuit coupled to the load buffer to de-allocate an entry in the load buffer representing the senior load instruction after retirement and prior to execution of the senior load instruction.

26. The microprocessor of claim 25 further including:
a re-order buffer coupled to the decoder, the re-order buffer to receive a write-back data valid bit returned from the memory ordering unit prior to the senior load instruction being retired in order; and
a reservation station coupled between the memory ordering unit and the decoder, the reservation station to dispatch the load instruction to the memory ordering unit.

27. The microprocessor of claim 26 wherein the de-allocating circuit further comprises:
a matching circuit to match a retirement pointer with a pointer destination associated with the entry in the load buffer, the retirement pointer being sent from the re-order buffer to the memory ordering unit; and an updating circuit to update a tail pointer to point to a next entry in the load buffer.

28. The microprocessor of claim 24 wherein the load buffer is in the memory ordering unit.

29. The microprocessor of claim 24 wherein the load buffer is in a memory controller.

30. The microprocessor of claim 24 further comprising:
a re-order buffer to receive a write-back data valid signal to retire the senior load instruction in order.

31. The microprocessor of claim 24 wherein the memory ordering unit further to determine if the load instruction requests to load data from the memory without updating contents of registers in the instruction execution apparatus.

32. The microprocessor of claim 24 wherein
the senior load instruction is a type of load instruction that can be retired before data transfer is completed.

33. The microprocessor of claim 24 wherein
the load buffer includes a senior load control bit associated with the load instruction, and
the load buffer to store one or more entries of load instructions within the instruction execution apparatus.

34. The microprocessor of claim 33 wherein
the senior load control bit is set to indicate that a write-back valid bit has been sent to a re-order buffer and that the senior load instruction is ready to be retired.

35. The microprocessor of claim 34 wherein
the senior load control bit is cleared to indicate that the senior load instruction has been accepted by a cache controller for execution.

36. A computer including:
a memory; and
at least one microprocessor coupled to the memory, the at least one microprocessor including,
a decoder to decode a load instruction, the load instruction requesting a memory reference associated with the memory;
a memory ordering unit to receive the load instruction dispatched from the decoder to the memory ordering unit and to determine that the load instruction is a senior load instruction;
a load buffer to store the senior load instruction, the senior load instruction to be retired in order and prior to its execution so that other instructions can execute and retire before and without waiting for the senior load instruction to execute; and
wherein the microprocessor to execute the senior load instruction out of order after the senior load instruction is retired in order.

37. The computer of claim 36 wherein the microprocessor further includes:
a memory controller to receive a request of the memory reference after the senior load instruction is retired; and
a de-allocating circuit coupled to the load buffer to de-allocate an entry in the load buffer representing the senior load instruction after retirement and prior to execution of the senior load instruction.

38. The computer of claim 36 wherein the microprocessor further includes:
a re-order buffer to receive a write-back data valid signal to retire the senior load instruction in order.

39. The computer of claim 38 wherein the microprocessor further includes:
a matching circuit to match a retirement pointer with a pointer destination associated with an entry in the load buffer, the retirement pointer being sent from the re-order buffer to the memory ordering unit.

40. The computer of claim 36 wherein
the senior load instruction is a type of load instruction that can be retired before data transfer is completed.

41. The computer of claim 36 wherein the microprocessor further includes:
a reservation station coupled between the memory ordering unit and the decoder, the reservation station to dispatch the load instruction to the memory ordering unit.

42. The computer of claim 36 wherein the microprocessor further includes:
an updating circuit to update a tail pointer to point to a next entry in the load buffer.

43. The computer of claim 36 wherein
the load buffer stores one or more entries of load instructions within the at least one microprocessor, and
the load buffer includes a senior load control bit associated with each of the one or more entries of load instructions.

44. The computer of claim 43 wherein
the senior load control bit is set to indicate that a writeback valid bit has been sent to a re-order buffer and that the senior load instruction is ready to be retired.

45. The computer of claim 43 wherein
the senior load control bit is cleared to indicate that the senior load instruction has been accepted by a cache controller for execution.

\* \* \* \* \*

UNITED STATES PATENT AND TRADEMARK OFFICE
CERTIFICATE OF CORRECTION

PATENT NO.   : 6,216,215 B1                               Page 1 of 1
DATED        : April 10, 2001
INVENTOR(S)  : Palanca et al.

It is certified that error appears in the above-identified patent and that said Letters Patent is hereby corrected as shown below:

<u>Column 12,</u>
Line 6, delete "enabaled" and insert -- enabled --.

Signed and Sealed this

Seventh Day of May, 2002

Attest:

Attesting Officer

JAMES E. ROGAN
*Director of the United States Patent and Trademark Office*